(12) United States Patent
Mao et al.

(10) Patent No.: US 6,466,461 B2
(45) Date of Patent: Oct. 15, 2002

(54) METHOD AND CIRCUIT FOR REDUCING VOLTAGE LEVEL VARIATION IN A BIAS VOLTAGE IN A POWER CONVERTER

(75) Inventors: Hengchun Mao; Yimin Jiang, both of Plano, TX (US)

(73) Assignee: NetPower Technologies, Inc.

( * ) Notice: Subject to any disclaimer, the term of this patent is extended or adjusted under 35 U.S.C. 154(b) by 0 days.

(21) Appl. No.: 10/068,252

(22) Filed: Feb. 7, 2002

(65) Prior Publication Data

US 2002/0110006 A1 Aug. 15, 2002

Related U.S. Application Data

(60) Provisional application No. 60/267,835, filed on Feb. 9, 2001.

(51) Int. Cl.[7] .............................................. H02M 3/335
(52) U.S. Cl. .................................................. 363/21.08
(58) Field of Search ........................... 363/21.08, 21.09, 363/21.16, 21.17, 24

(56) References Cited

U.S. PATENT DOCUMENTS

| | | | | |
|---|---|---|---|---|
| 3,971,975 A | * | 7/1976 | Genuit | 363/47 |
| 4,230,955 A | * | 10/1980 | Johannessen | 327/380 |
| 6,061,252 A | * | 5/2000 | Hosotani | 363/134 |
| 6,320,763 B2 | * | 11/2001 | Hosotani | 363/16 |
| 6,366,480 B2 | * | 4/2002 | Hosotani et al. | 363/21.02 |

* cited by examiner

*Primary Examiner*—Bao Q. Vu
(74) *Attorney, Agent, or Firm*—Enrique J. Mora; Beusse, Brownlee, Bowdoin & Wolter, PA

(57) ABSTRACT

Circuit and method for reducing voltage level variation in a bias voltage generated in a power converter device are provided. The method allows providing a first voltage source configured to supply a first voltage during one respective mode of operation of the power converter, wherein the level of the voltage supplied by the first voltage source is directly proportional to variation in an input voltage of the converter device. The method further allows providing a second voltage source configured to supply a second voltage during another respective mode of operation of the power converter, wherein the level of the voltage supplied by the second voltage source has a generally inverse proportional relationship relative to variation in the input voltage of the converter device. At least one circuit parameter is selected in the voltage sources to adjust the respective levels of the first and second voltages. The first and second voltages are combined with one another to generate a combined voltage that comprises the bias voltage in the power converter device, the combined voltage resulting in a bias voltage level being relatively impervious to variation in the input voltage of the converter device.

24 Claims, 6 Drawing Sheets

METHOD AND CIRCUIT FOR REDUCING VOLTAGE LEVEL VARIATION IN A BIAS VOLTAGE IN A POWER CONVERTER

This application claims the benefit of U.S. Patent Application Ser. No. 60/267,835 filed on Feb. 9, 2001.

BACKGROUND OF THE INVENTION

The present invention is generally related to control and operation of power converter devices, and, more particularly, to circuits and techniques that improve the performance of circuitry that generates a dc bias voltage for use in the primary and/or secondary stages of a power converter, such as single-ended forward-converters, single-ended flyback converters, asymmetric half-bridge converter and other variations operated under similar principles. The bias voltage may be used to power control circuitry and/or drivers of power switches of the converter.

DC/DC power converter devices are widely used in numerous applications, such as telecommunications and networking applications. A dc/dc converter is an electronics device that converts a raw dc (direct current) voltage input, usually with a certain variation range, to a dc voltage output that meets a set of specifications. With fast-growing technologies used in telecommunications equipment, the demands on the power density and conversion efficiency of dc/dc converters continue to increase.

FIG. 1 is a schematic diagram of a basic power converter 10 used in an exemplary forward converter topology that uses biasing circuitry 12 for generating a dc bias voltage. Circuitry 12 includes a single bias winding Tb coupled with the power windings of a power transformer T.

It is known that when a main power switch Q1 coupled to the primary winding of transformer T is turned on, a voltage proportional to the input voltage Vin is generated in the bias winding Tb that charges a filter capacitor 16 through a rectifier diode 14 to establish the bias voltage Vbias. One drawback of this known scheme, as illustrated in FIG. 2, is that the voltage Vbias varies in proportion to the input voltage, which in many cases has voltage swings over a relatively wide range, such as from 36V to about 75V in typical telecommunications applications. Unfortunately, the voltage swings could result in excessive power losses when the bias voltage Vbias reaches levels higher than the desired voltage bias level. The designer may also be forced to raise the voltage rating of the components in the bias circuitry and/or the circuitry that is powered by this bias voltage. Needless to say, this would result in burdensome incremental costs for the power converter. Although changing the polarity of the bias winding Tb may somewhat reduce the variation range of the voltage bias Vbias in some cases, the reduction is usually not significant, considering that both input voltage and output voltage can change in a typical dc-dc converter.

Thus, it would be desirable to provide bias control techniques and circuits that, at relatively low-cost, improve the performance of bias circuitry, such as may be used in dc/dc power converters in order to advantageously reduce power losses and increase the overall efficiency of the power converter.

BRIEF SUMMARY OF THE INVENTION

Generally, the present invention fulfills the foregoing needs by providing in one aspect thereof a method for reducing voltage level variation in a bias voltage generated in a power converter device. The method allows providing a first voltage source configured to supply a first voltage during one respective mode of operation of the power converter, wherein the level of the voltage supplied by the first voltage source is directly proportional to variation in an input voltage of the converter device. The method further allows providing a second voltage source configured to supply a second voltage during another respective mode of operation of the power converter, wherein the level of the voltage supplied by the second voltage source has a generally inverse proportional relationship relative to variation in the input voltage of the converter device. At least one circuit parameter is selected in the voltage sources to adjust the respective levels of the first and second voltages. The first and second voltages are combined with one another to generate a combined voltage that comprises the bias voltage in the power converter device, the combined voltage resulting in a bias voltage level being relatively impervious to variation in the input voltage of the converter device.

The present invention further fulfills the foregoing needs by providing in another aspect thereof, a circuit for reducing voltage level variation in a bias voltage generated in a power converter device. The circuit includes a first voltage source configured to supply a first voltage during one respective mode of operation of the power converter, wherein the level of the voltage supplied by the first voltage source is directly proportional to variation in an input voltage of the converter device. A second voltage source is configured to supply a second voltage during another respective mode of operation of the power converter, wherein the level of the voltage supplied by the second voltage source has a generally inverse proportional relationship relative to variation in the input voltage of the converter device, with at least one circuit parameter being selected in the voltage sources to adjust the respective levels of the first and second voltages, and further wherein the first and second voltages are additively coupled to generate a combined voltage that comprises the bias voltage in the power converter device, the combined voltage resulting in a bias voltage level being relatively impervious to variation in the input voltage of the converter device.

BRIEF DESCRIPTION OF THE DRAWINGS

The features and advantages of the present invention will become apparent from the following detailed description of the invention when read with the accompanying drawings in which:

FIGS. 5A–8A illustrate respective variations of the bias circuit of FIG. 4A.

FIGS. 5B–8B respectively illustrate exemplary plots of voltage bias as a function of input voltage for the circuits of FIGS. 5A–8A.

DETAILED DESCRIPTION OF THE INVENTION

Figure 4B:
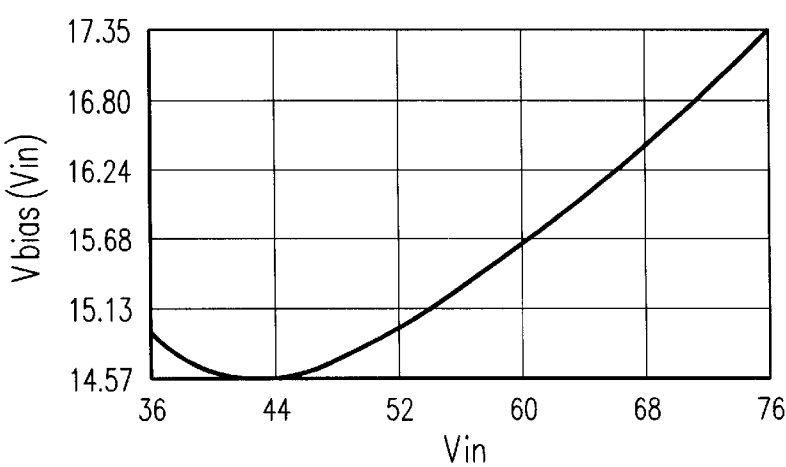
FIG. 4B is an exemplary plot of voltage bias as a function of input voltage for the circuit of FIG. 4A.
Figure 4A:
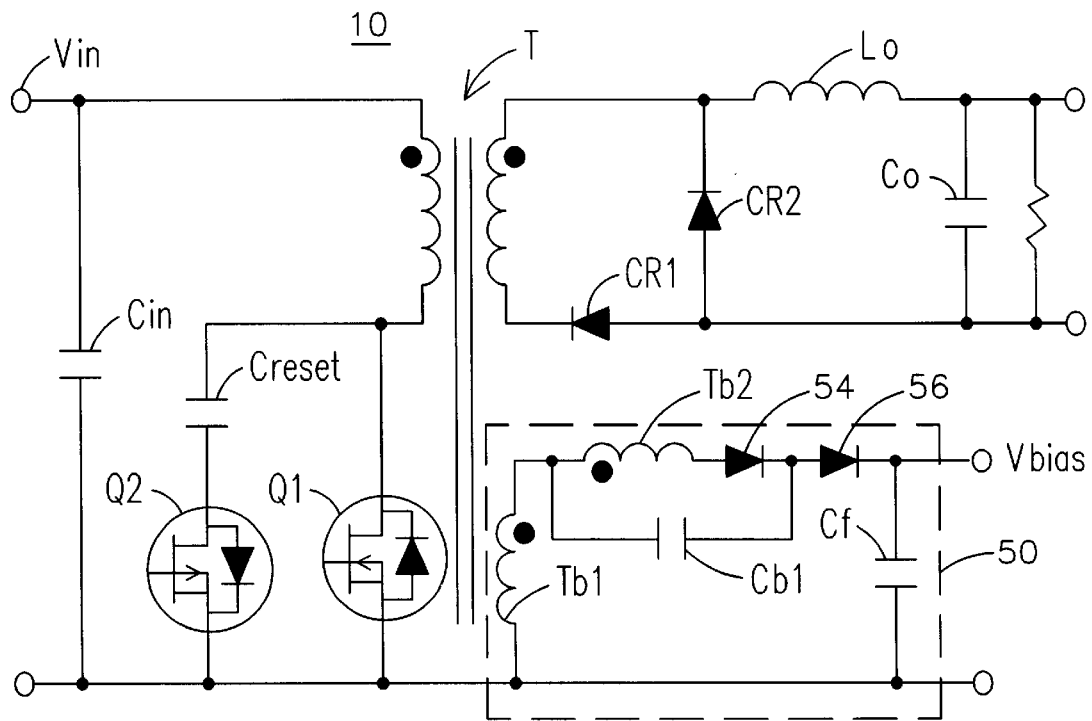
FIG. 4A illustrates one exemplary embodiment of a bias circuit that in accordance with aspects of the present invention allows generating a bias voltage that is less sensitive to swings in the input voltage range as compared to the biasing circuit of FIG. 1.

In one aspect thereof, as shown in FIG. 4A, the present invention uses first and second voltage sources, such as bias windings Tb1 and Tb2 that are coupled with an isolating transformer T in a power converter device. The first and second bias windings Tb1 and Tb2, when coupled with one another and with appropriate selection of basic circuit parameters, such as number of turns, polarities, and in cooperation with a few associated components, such as diodes 54 and 56, at least one intermediate voltage-holding capacitor Cb1, and a filter capacitor $C_f$ coupled in parallel circuit with the load (not shown) to which bias circuit 50 delivers energy, allow generating a bias voltage that is significantly less sensitive to input voltage variation in a DC-to-DC power converter, such as single-ended dc/dc converters, and including various converter topologies, such as active-clamp forward converter topology, and active-clamp flyback or asymmetric half-bridge converter topologies.

Figure 1:
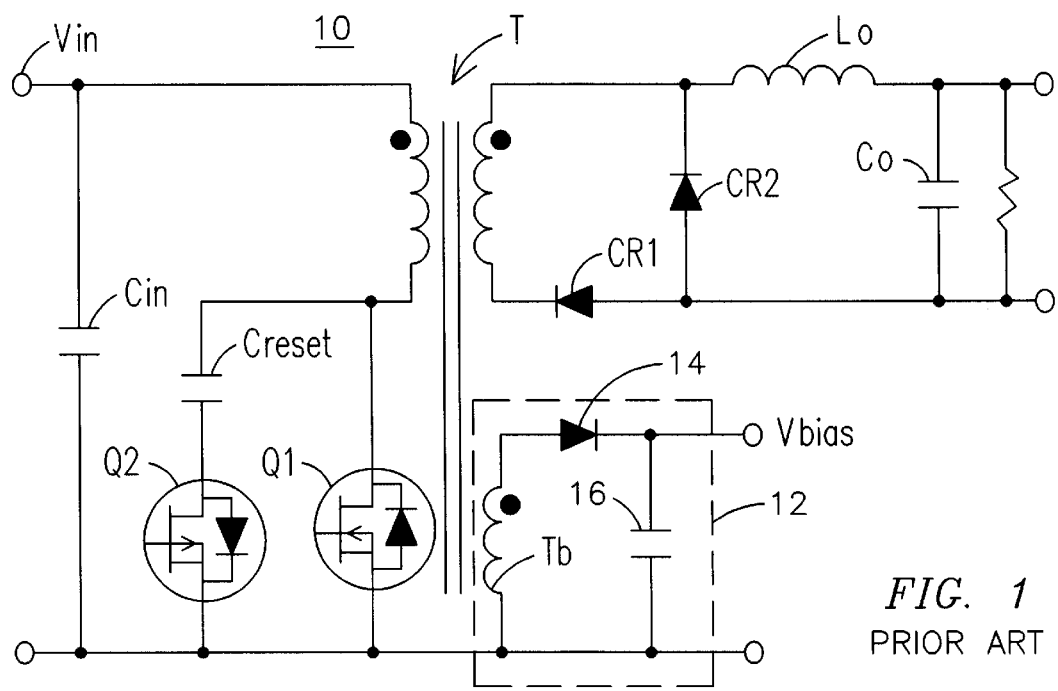
FIG. 1 is a schematic diagram of a basic power converter used in one exemplary forward converter topology that uses biasing circuitry for generating a dc bias voltage that is susceptible to swings in the input voltage.
Figure 2:
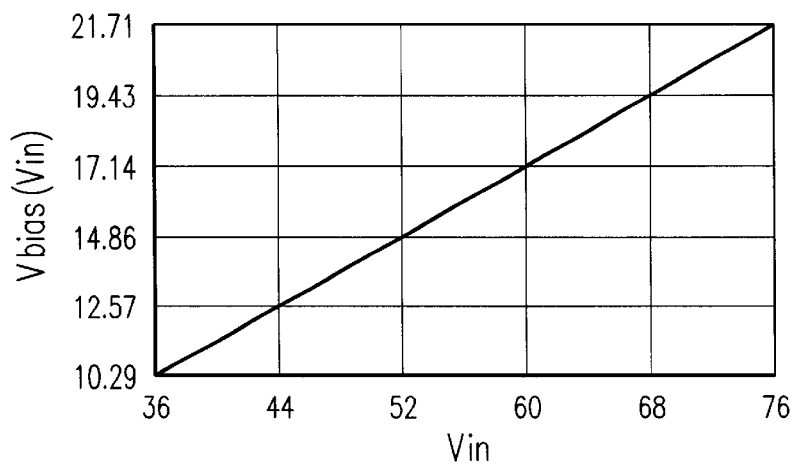
FIG. 2 is a plot illustrating exemplary voltage bias variation relative to the input voltage of the power converter of FIG. 1.
Figure 3:
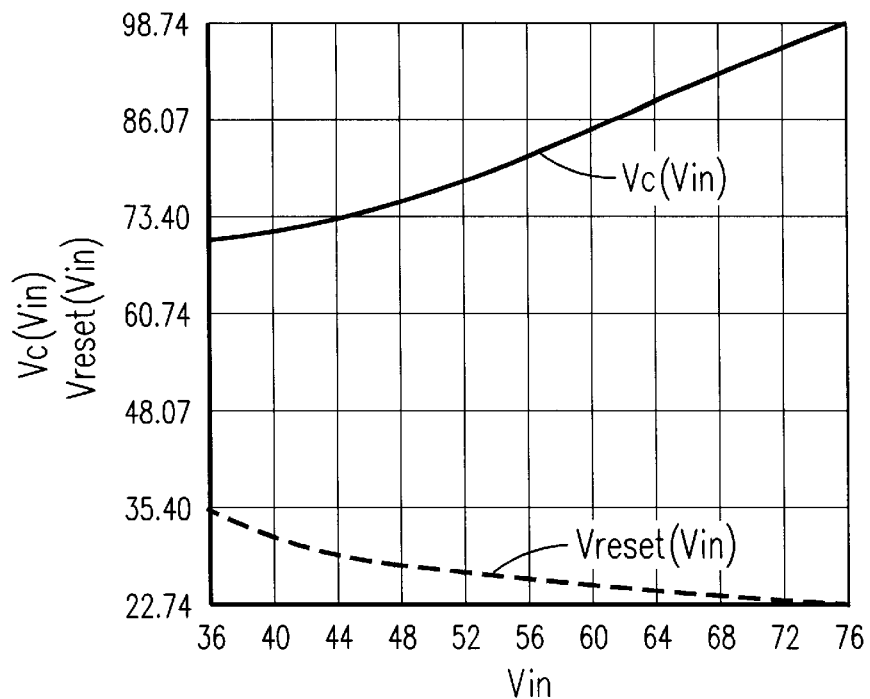
FIG. 3 illustrates certain operational characteristics of the power converter of FIG. 1, such as a reset voltage applied to a transformer winding that changes in an inverse relationship as compared to the input voltage. The inventors of the present invention innovatively recognized that a properly weighted summation of the input voltage and the reset voltage can be advantageously used to generate a bias voltage that is less sensitive to swings over the input voltage range as compared to the biasing circuit of FIG. 1.

For purposes of illustration, assuming the active-clamp forward converter of FIG. 1, as shown in FIG. 3, the level of the reset voltage on the transformer winding (i.e., the voltage applied to transformer T when clamp switch Q2 is turned on, based in part on the voltage on a reset capacitor, Creset) decreases as the input voltage increases. The inventors of the present invention innovatively recognized that a properly weighted summation of the input voltage and the reset voltage can be advantageously used to generate a bias voltage that is less sensitive to swings over the input voltage range as compared to biasing circuit 12 (FIG. 1) with a single voltage source whose output variation directly proportionally reflects voltage swings in the input voltage.

FIG. 4A illustrates one exemplary embodiment of a bias circuit 50 that generates such a bias voltage. Intermediate voltage-holding capacitor Cb1 is charged by the voltage of the winding Tb2 during the reset period when the main power switch Q1 is OFF and clamp switch Q2 is ON. During this mode of operation, diode 54 would be in a conductive state and diode 56 would be in a non-conductive state. The voltage level to which intermediate voltage-holding capacitor Cb1 is charged is proportional to the reset voltage with a scaling factor being determined by the turns-ratio of the primary power winding and bias winding Tb2, assuming the capacitance of intermediate capacitor Cb1 is appropriately selected. During the period when the main power switch Q1 is ON, the voltage on winding Tb1 and the voltage on intermediate voltage-holding capacitor Cb1 are in series circuit to deliver energy to the output load across filter capacitor $C_f$. During this mode of operation, i.e., when power switch Q1 is ON to induce a forward voltage, diode 56 would be in a conductive state and diode 54 would be in a non-conductive state. If the capacitance of intermediate voltage-holding capacitor Cb1 is sufficient, its voltage will be held essentially unchanged during this period. The combined voltage of the two voltage sources, exclusive of any voltage drop across any of diodes 52 and 54, comprises the bias voltage, Vbias, to which, in operation, filter capacitor $C_f$ is charged to and holds while delivering energy to the load connected to the bias circuit.

As will be now apparent to those skilled in the art, the bias voltage level, without considering voltage drop across diodes 54 and 56, (which voltage drop is usually relatively small compared to the winding voltages), is provided by the following equation:

$$Vbias = Vin*nb1/np + Vreset*nb2/np \quad \text{Equation 1}$$

Where parameters nb1 and nb2 represent the number of turns of the first and second bias windings Tb1 and Tb2 respectively, and np represents the number of turns of the primary winding.

For a given input voltage range, the range of the bias voltage can be set by appropriately selecting parameters nb1 and nb2 relative to the number of turns in the primary winding. In most cases, the variation of the bias voltage can be greatly reduced compared with swings in the input voltage range. FIG. 4B is a plot of Vbias as a function of input voltage (Vin), in one exemplary circuit. It should be appreciated that the present invention is not limited to any specific range for the input voltage, nor is it limited to any specific windings ratios for first and second windings Tb1 and Tb2. Further, parameters nb1 and nb2 need not be limited to integer values. For example, an equivalent half-turn winding can be obtained by winding one turn around one of the outer legs in any E-shaped core where the main power windings are usually winded around the center leg. The ability to use fractional values is believed to provide further flexibility to the designer to reduce the variation of the bias voltage, Vbias. As will be readily appreciated by those skilled in the art, when the required turns for windings Tb1 and Tb2 are the same, the first and second voltage sources can be integrated into the same physical winding Tb as shown in FIG. 4C. That is, the first and second voltage sources could share a common winding or portions thereof. It will be appreciated that, depending on the requirements of any given application, other components can be optionally added to further improve the performance without changing the basic principles of this invention. For example, a noise-suppression resistor (not shown) may be added in series with bias windings, Tb1, Tb2, or both, to reduce any ripple voltage and/or current spike in the bias circuit. As discussed in greater detail below, it will be appreciated that there are several circuit variations that can be implemented for bias circuit 50 that can produce essentially the same results as those described in the context of FIGS. 4A and 4B.

FIGS. 5–8 illustrate respective bias circuit embodiments with various winding polarity combinations that operate essentially under the principles discussed in the context of FIGS. 4A and 4B. It will be appreciated that the circuit location of intermediate voltage-holding capacitor Cb1, and diodes 54 and 56 relative to bias windings Tb1 and Tb2 may also vary.

Figure 5A:
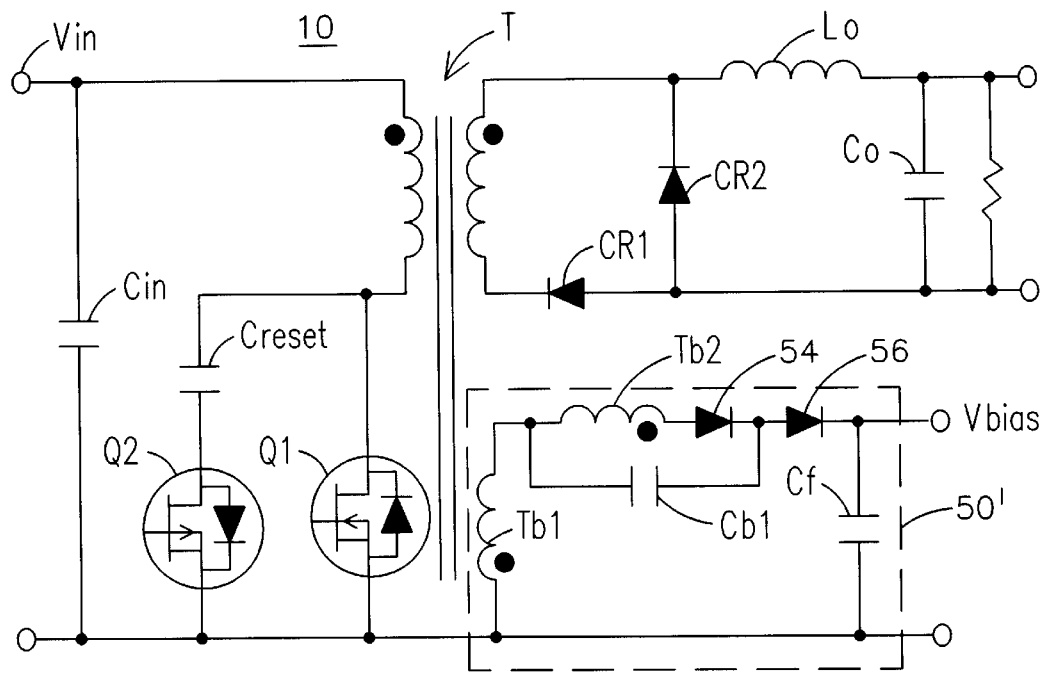

Once again excluding any voltage drop across diodes 54 and 56, the bias voltage level for the circuit of FIG. 5A is based on the following equation:

$$Vbias = Vin*nb2/np + Vreset*nb1/np \quad \text{Equation 2}$$

Figure 5B:
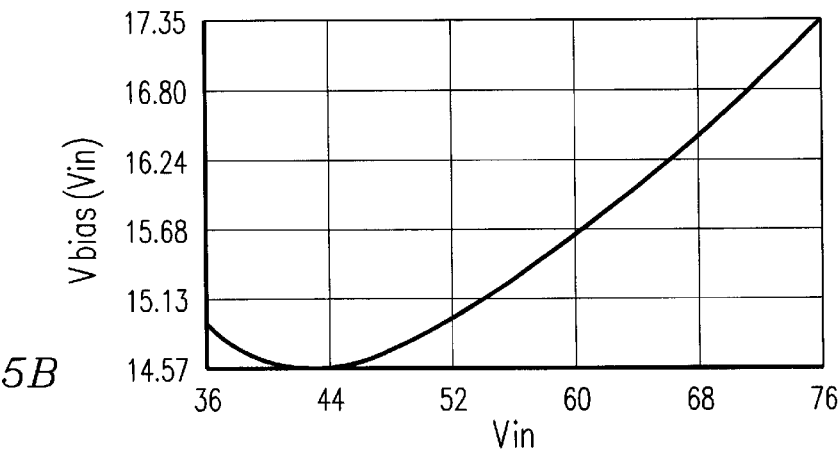

As will be appreciated by those skilled in the art, the first term in Equation 2 represents the voltage to which intermediate voltage-holding capacitor Cb1 is charged by way of the voltage supplied by bias winding Tb2 when power switch Q1 is ON. During this period of operation, diode 54 would be in a conductive state and diode 56 would be in a non-conductive state. The second term in Equation 2 represents the voltage from bias winding Tb1 coupled to deliver energy to the load across filter capacitor $C_f$ during the reset period. During this period of operation, diode 56 would be in a conductive state and diode 54 would be in a non-conductive state. FIG. 5B is an exemplary plot of Vbias as a function of input voltage for the bias circuit 50$^i$ of FIG. 5A, assuming the number of turns of windings Tb1 and Tb2 is two and one, respectively.

Figure 6B:
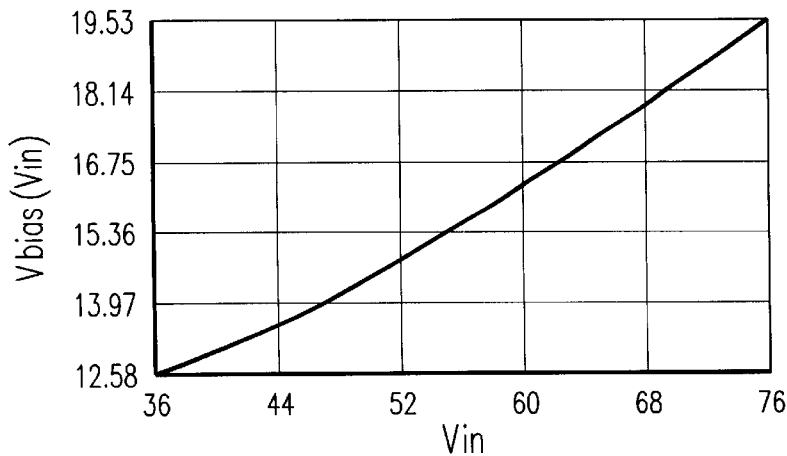
Figure 6A:
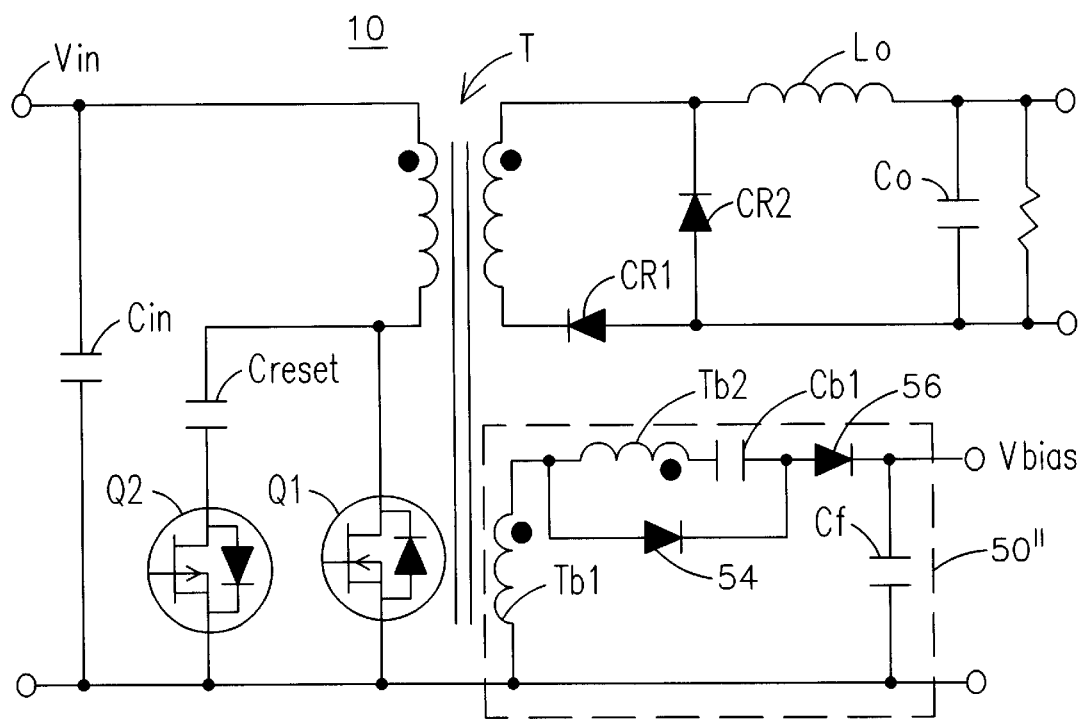

The bias voltage level for the circuit of FIG. 6A is based on the following equation:

$$Vbias=Vin*(nb1+nb2)/np+Vreset*nb2/np \quad \text{Equation 3}$$

As will be appreciated by those skilled in the art, the first term in Equation 3 represents the voltage provided by bias windings Tb1 and Tb2 in series when power switch Q1 is ON. During this period of operation, diode 56 would be in a conductive state and diode 54 would be in a non-conductive state. The second term represents the voltage to which intermediate voltage-holding capacitor Cb1 is charged by bias winding Tb2 during the reset period. During this period of operation, diode 54 would be in a conductive state and diode 56 would be in a non-conductive state. In this embodiment, filter capacitor $C_f$ would be charged when power switch Q1 is ON. FIG. 6B is an exemplary plot of Vbias as a function of input voltage (Vin) for the bias circuit 50$^{ii}$ of FIG. 6A, assuming the number of turns of windings Tb1 and Tb2 is 1/2 and 1 respectively.

Figure 7A:
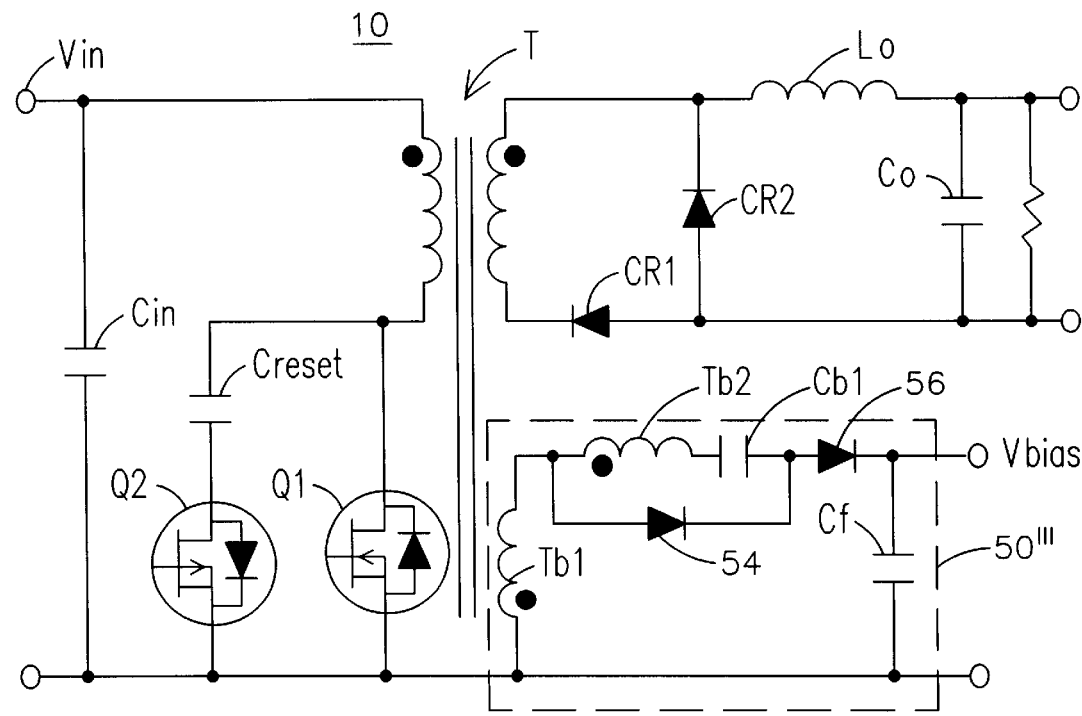

The bias voltage level for the circuit of FIG. 7A is based on the following equation:

$$Vbias=Vin*nb2/np+Vreset*(nb1+nb2)/np \quad \text{Equation 4}$$

In Equation 4, the first term represents the voltage to which intermediate voltage-holding capacitor Cb1 is charged by bias winding Tb2 when switch Q1 is ON. The second term represents the voltage supplied by bias windings Tb1 and Tb2 during the reset period. The second term allows charging filter capacitor $C_f$.

Figure 7B:
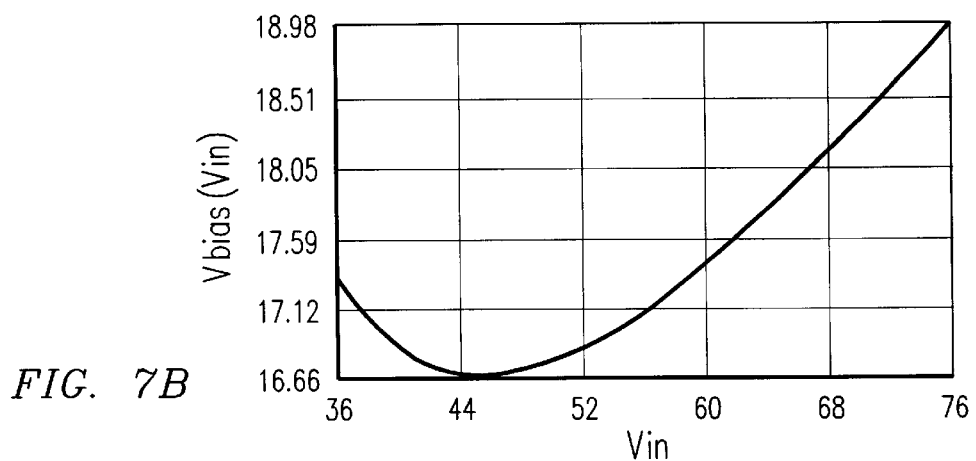

FIG. 7B is an exemplary plot of Vbias as a function of input voltage (Vin) for the bias circuit 50$^{iii}$ of FIG. 7A, assuming the number of turns of windings Tb1 and Tb2 is 11/2 and 1 respectively.

Figure 8A:
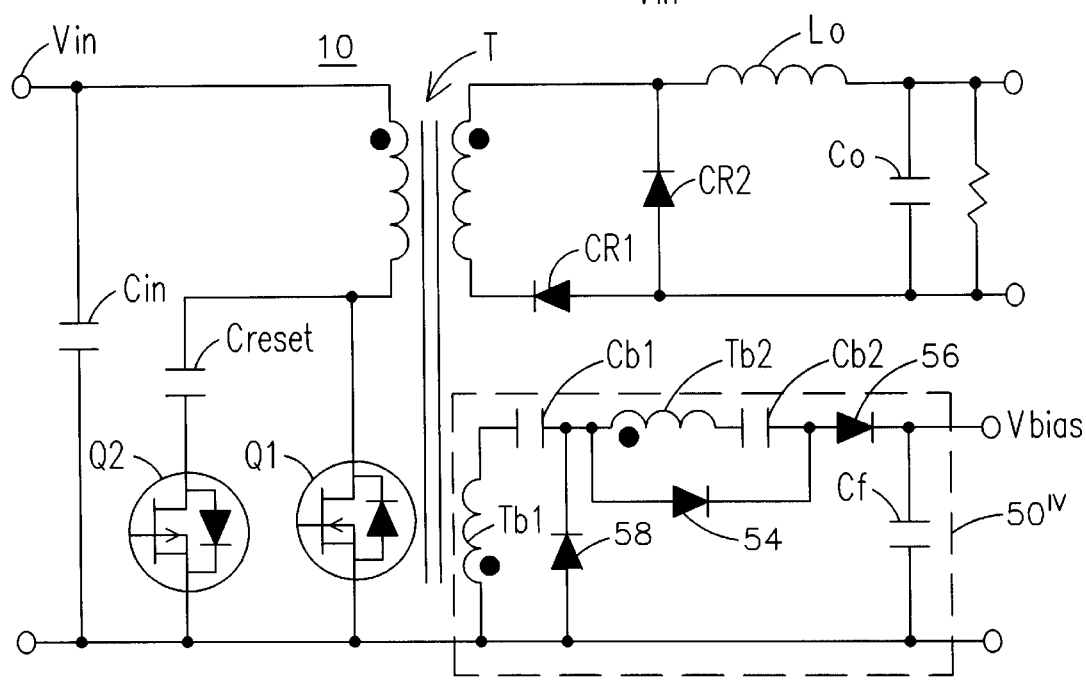

The bias voltage level for the circuit of FIG. 8A is based on the following equation:

$$Vbias=Vin*(nb1+nb2)/np+Vreset(Vin)*(nb1+nb2)/np \quad \text{Equation 5}$$

The first term in Equation 5 represents the voltage to which a pair of intermediate voltage-holding capacitors Cb1 and Cb2 would be respectively charged by bias windings Tb1 and Tb2 through diodes 58 and 54, respectively, when switch Q1 is on. The second term represents the voltage supplied by windings Tb1 and Tb2 during the reset period. Filter capacitor $C_f$ would be charged during the reset period, i.e., when switch Q2 on.

Figure 8B:
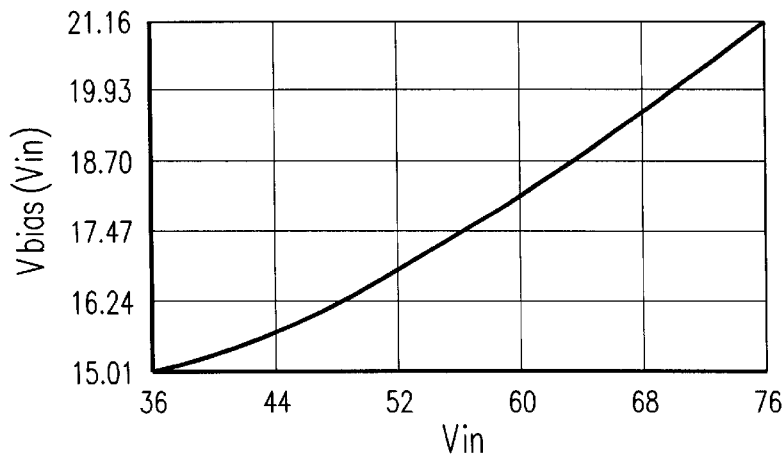
Figure 9:
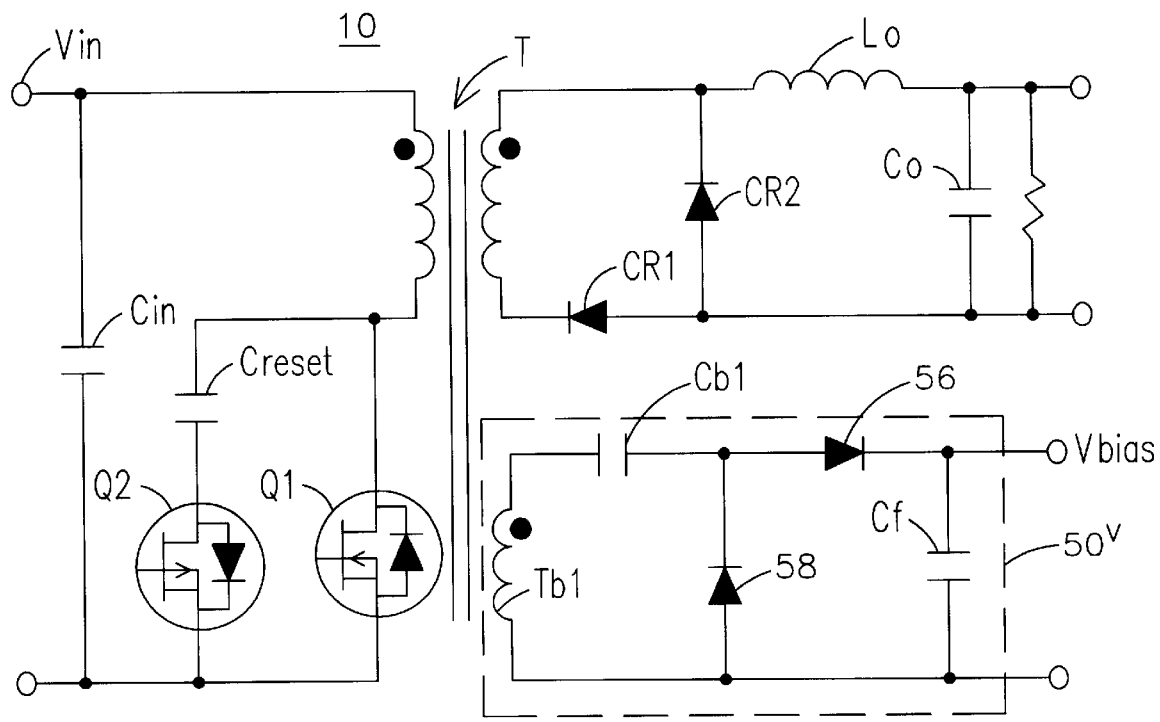

FIG. 8B is an exemplary plot of Vbias as a function of input voltage (Vin) for the bias circuit 50$^{iv}$ of FIG. 8A, assuming the number of turns of windings Tb1 and Tb2 is one and 0.5 respectively.

In each of the foregoing calculations, intermediate voltage-holding capacitor Cb is assumed to have high enough capacitance so that its voltage remains essentially constant during a switching cycle. It will be appreciated, however, that if in a given application relatively low capacitance is used, by adjusting the capacitance of any intermediate voltage-holding capacitor Cb, the level of Vbias can also be adjusted, at least in some range, due to a corresponding voltage change across the voltage-holding capacitor Cb when current flows through it since dv/dt=Capacitance/Current. Similarly, the value of any spike-suppression resistor can also be used to reduce the voltage level of Vbias. Using basic and well-known circuit design techniques, which would be readily understood by those skilled in the art, the designer can readily determine the actual capacitance and/or resistance values to be used in any given application.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for reducing voltage level variation in a bias voltage generated in a power converter device, the method comprising:

providing a first voltage source configured to supply a first voltage during one respective mode of operation of the power converter, wherein the level of the voltage supplied by the first voltage source is directly proportional to variation in an input voltage of the converter device;

providing a second voltage source configured to supply a second voltage during another respective mode of operation of the power converter, wherein the level of the voltage supplied by the second voltage source has a generally inverse proportional relationship relative to variation in the input voltage of the converter device;

selecting at least one circuit parameter in the voltage sources to adjust the respective levels of the first and second voltages; and combining the first and second voltages to generate a combined voltage that comprises the bias voltage in the power converter device, the combined voltage resulting in a bias voltage level being relatively impervious to variation in the input voltage of the converter device.

2. The method of claim 1 wherein each voltage source comprises at least one bias winding coupled to a transformer in the power converter device.

3. The method of claim 1 wherein each voltage source is coupled to share at least a portion of a common winding.

4. The method of claim 2 wherein the second voltage is based on a reset voltage being applied to the transformer during a transformer reset period.

5. The method of claim 4 wherein said transformer reset period comprises one of the respective modes of operation of the power converter, and wherein a period of forward-voltage generation comprises the other of the respective modes of operation of the power converter.

6. The method of claim 1 further comprising coupling at least one intermediate voltage-holding capacitor for holding voltage supplied by at least one of the voltage sources during one of the respective modes of operation of the power converter.

7. The method of claim 6 further comprising coupling at least one filter capacitor for holding the voltage supplied by at least one of the voltage sources and the at least one intermediate voltage-holding capacitor during the other of the respective modes of operation of the power converter.

8. The method of claim 6 further comprising adjusting the capacitance of the at least one intermediate voltage-holding capacitor to adjust the voltage level of the bias voltage.

9. The method of claim 6 further comprising coupling a first diode to provide a voltage charging path to the intermediate voltage-holding capacitor from at least one of the voltage sources during one of the respective modes of operation of the power converter, said first diode being further coupled to provide a non-conductive path during the other of the respective modes of operation of the power converter.

10. The method of claim 9 further comprising coupling a second diode to provide an energizing path through a series connection of at least one of the voltage sources and the at least one intermediate voltage-holding capacitor to any load coupled to receive the bias voltage during the other of the respective modes of operation of the converter device, said second diode being further coupled to provide a non-conductive path when the first diode is conductively coupled.

11. The method of claim 2 wherein the at least one circuit parameter being selected comprises a respective turns ratio of the bias windings relative to a primary winding of the transformer.

12. The method of claim 11 wherein the turns ratio of the bias windings is fractionally adjustable.

13. A circuit for reducing voltage level variation in a bias voltage generated in a power converter device, the circuit comprising:

a first voltage source configured to supply a first voltage during one respective mode of operation of the power converter, wherein the level of the voltage supplied by the first voltage source is directly proportional to variation in an input voltage of the converter device;

a second voltage source configured to supply a second voltage during another respective mode of operation of the power converter, wherein the level of the voltage supplied by the second voltage source has a generally inverse proportional relationship relative to variation in the input voltage of the converter device, with at least one circuit parameter being selected in the voltage sources to adjust the respective levels of the first and second voltages, and further wherein the first and second voltages are additively coupled to generate a combined voltage that comprises the bias voltage in the power converter device, the combined voltage resulting in a bias voltage level being relatively impervious to variation in the input voltage of the converter device.

14. The circuit of claim 13 wherein each voltage source comprises at least one bias winding coupled to a transformer in the power converter device.

15. The circuit of claim 13 wherein each voltage source is coupled to share at least a portion of a common winding coupled to a transformer in the power converter device.

16. The circuit of claim 14 wherein the second voltage is based on a reset voltage being applied to the transformer during a transformer reset period.

17. The circuit of claim 16 wherein said transformer reset period comprises one of the respective modes of operation of the power converter, and wherein a period of forward-voltage generation comprises the other of the respective modes of operation of the power converter.

18. The circuit of claim 13 further comprising at least one intermediate voltage-holding capacitor for holding voltage supplied by at least one of the voltage sources during one of the respective modes of operation of the power converter device.

19. The circuit of claim 18 further comprising at least one filter capacitor for holding the voltage supplied by at least one of the voltage sources and the at least one intermediate voltage-holding capacitor during the other of the respective modes of operation of the power converter.

20. The circuit of claim 18 wherein the capacitance of the at least one intermediate voltage-holding capacitor is adjustable to controllably affect the level of the bias voltage.

21. The circuit of claim 18 further comprising a first diode coupled to provide a voltage charging path to the at least one intermediate voltage-holding capacitor from at least one of the voltage sources during one of the respective modes of operation of the power converter, said first diode being further coupled to provide a non-conductive path during the other of the respective modes of operation of the converter device.

22. The circuit of claim 19 further comprising a second diode coupled to provide an energizing path through a series connection of at least one of the voltage sources and the at least one intermediate voltage-holding capacitor to any load coupled to receive the bias voltage during the other of the respective modes of operation of the converter device, said second diode being further coupled to provide a non-conductive path when the first diode is conductively coupled.

23. The circuit of claim 14 wherein the at least one circuit parameter being selected comprises a respective turns ratio of the bias windings relative to a primary winding of the transformer.

24. The circuit of claim 23 wherein at least one of the bias windings is configured to provide a fractionally-adjustable turns ratio.

* * * * *